Nov. 9, 1937.  H. J. VAN DOORNE ET AL  2,098,894
REAR WHEEL SUPPORT FOR A MOTOR VEHICLE
Filed Sept. 26, 1935  3 Sheets-Sheet 2

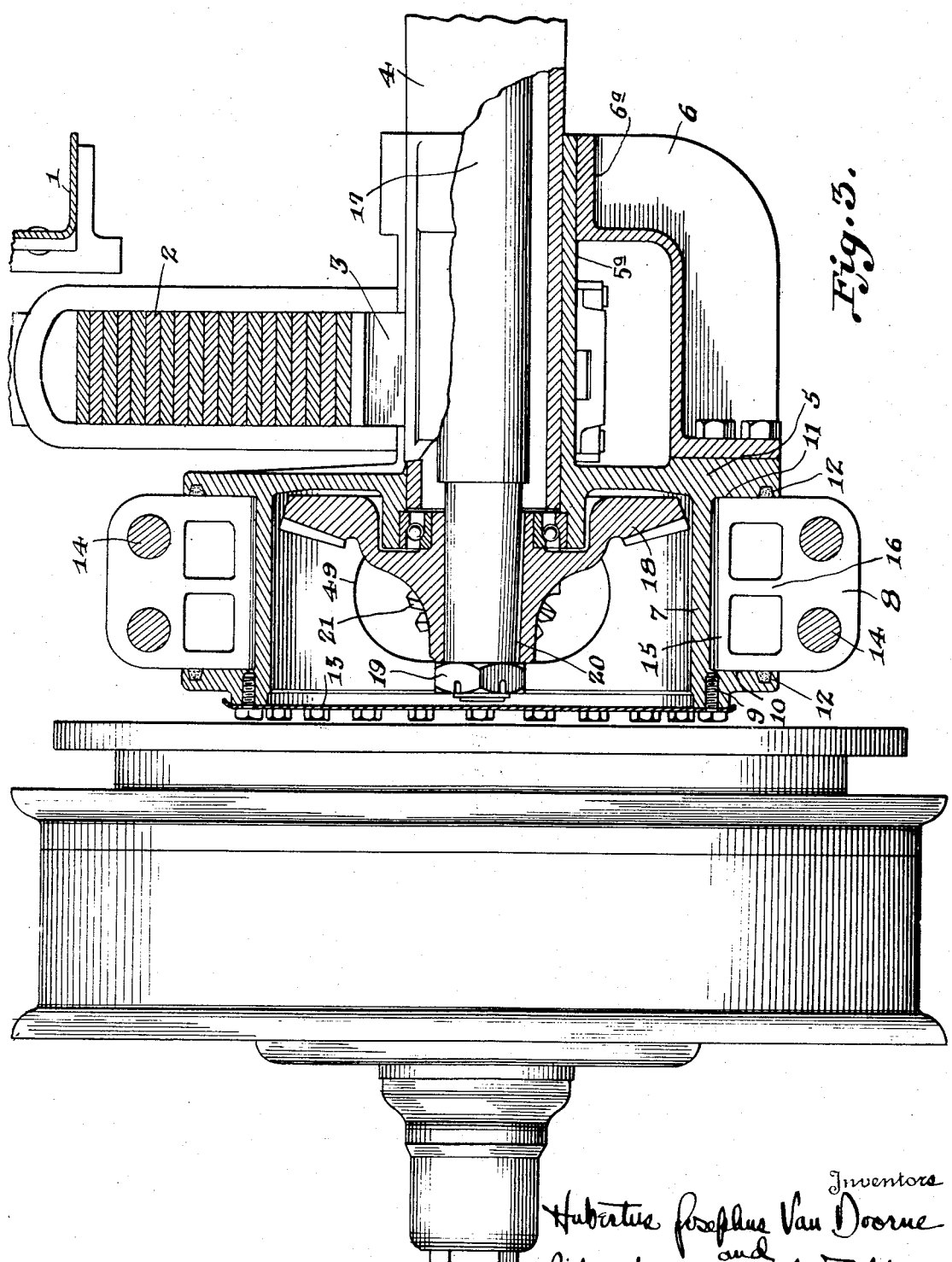

Patented Nov. 9, 1937

2,098,894

UNITED STATES PATENT OFFICE 2,098,894

REAR WHEEL SUPPORT FOR A MOTOR VEHICLE

Hubertus Josephus van Doorne, Deurne, and Pieter Herman van der Trappen, Breda, Netherlands Application September 26, 1935, Serial No. 42,360 In the Netherlands September 29, 1934

5 Claims. (Cl. 180—22)

Our invention relates to a rear axle support for a motor vehicle having a member adapted to rock around the axis of the rear axle housing, said rocking member being equipped near each end with means for receiving one or more road wheels and containing driving means for said wheels.

In known rear wheel supports of this kind the rocking member is adapted to swivel around a rear axle housing of special design; the driving means which are arranged in the box-shaped rocking member comprise a gear wheel secured to the end of the rear axle shaft, two intermediate gear wheels, one of which being arranged in front of the first-mentioned gear wheel and the other behind this gear wheel and both meshing with the same, whilst each of the intermediate gears is in mesh with a gear wheel secured to the shaft of each of the road wheels supporting the rocking member. This driving system for the road wheels has the drawback that the size of the gear wheels must be comparatively large so that the rocking member must be large too and the whole system is very heavy this increasing the unsprung weight in an undesirable way. A further drawback consists therein that it is not possible to remove by adjustment any play which will be caused by wear of the gear wheels since the distances between all of the gear shafts are invariable.

The purpose of our present invention is to procure a rear axle support which is adapted to be mounted on the normal rear axle housing of an existing motor vehicle in order to transform the same in a simple, inexpensive and efficient way to a motor vehicle being supported at the rear by a plurality of driving road wheels in order to be easily movable on uneven ground. A further purpose of our invention is to procure a rocking member with a driving system for the road wheels of such a kind that the unsprung weight is as low as possible and any play which might occur in the driving means is readily adjustable.

According to our invention the rocking member is adapted to swivel around a carrier which is intended to be rigidly connected to the rear axle housing of an existing vehicle, said carrier having bearing and thrust surfaces coaxial with said axle housing and suitably reinforced in a simple and efficient manner to maintain the surfaces coaxial with the housing, said surfaces carrying the rocking member which is disposed normal to the housing. This rocking member may contain propeller shafts of adjustable length for the road wheels with bevel pinions meshing with a bevel gear which is adapted to be fastened to the rear axle drive shaft whilst the other end of each of the propeller shafts carries a bevel pinion which meshes with a bevel gear connected to the road wheel drive shaft.

The drawings show by way of example one embodiment of a rear axle support according to our invention.

Fig. 3 is a vertical section taken on the line III—III in Fig. 2.

Figure 1:
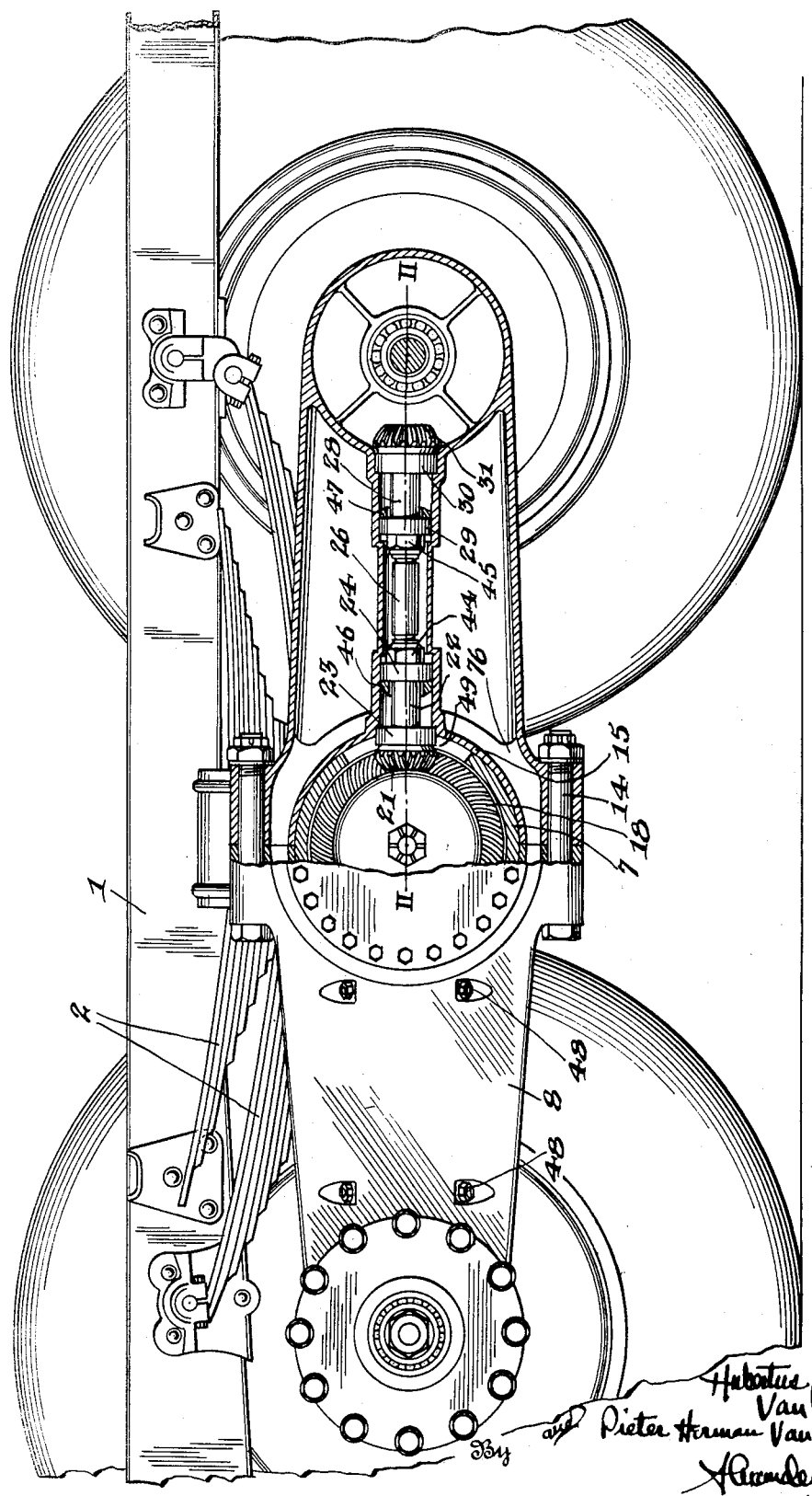
Fig. 1 is a side view of the rear part of a motor vehicle chassis a part of the rocking member being shown in section.

The drawings show a frame 1 which by means of springs 2 and a spring seat 3 bears upon a rear axle housing 4. In order to transform the normal rear axle support to a support comprising a plurality of road wheels so that the motor vehicle is adapted to be used on uneven ground, a carrier 5 is secured (e. g. by means of rivets) to each of the ends of the rear axle housing 4.

The carrier 5 includes a cylindrical bearing surface 7 coaxial with the axle housing 4 and serving as a bearing for rocking member 8 which is disposed normal to the axis of the housing 4. The carrier 5 is also provided with a bushing member 5a adapted to snugly receive the housing 4, said bushing 5a being of substantial length. The rigidity of carrier 5 is greatly increased by the provision of a bracket comprising three arms bolted to the end of the enlarged portion of carrier 5 adjacent the bearing surface 7, said arms terminating in an annular portion 6a which embraces the bushing member 5a of the carrier at its end remote from the bearing surface 7. Thus the arm 6 and annular portion 6a materially reinforce the carrier 5 and insure that the bearing surface 7 thereof will maintain the rocking member at all times normal to the axis of the housing 4. At the end of the cylindrical part 7 a radial flange 9 is formed, the inside 10 of which and a radial surface 11 at the other side of the cylindrical portion 7 being machined in order to form thrust faces for the sides of the rocking member, the radial thrust surfaces 10 and 11 of the bearing surface 7 cooperating with the sides of the rocking member 8 to prevent axial displacement of the rocking member. Grooves are arranged in the guiding faces 10 and 11 containing packing rings 12 for preventing leaking out of oil from, and access of dust to the bearing surfaces. The housing formed by the cylindrical part 7 of the carrier, is closed by a cover 13 fixed by means of screws.

The rocking member 8 which is adapted to swivel around the cylindrical portion of the carrier 5 is box-shaped and consists of two halves connected by bolts 14. A part 15 of each of the rocking member halves is machined cylindrically at the inside and is adapted to swivel around the carrier. The part 15 of the rocking member is connected with the outer wall by a rib 16. This rib acts at the same time as a support for the tubular part formed in the centerplane of the member and containing the drive shaft for the road wheels.

The portion of the axle shaft 17 extending beyond the axle housing 4 carries a bevel gear 18 which is secured by means of a nut 19 and a key 20. A bevel pinion 21 meshes with this bevel gear and has a shaft 22 which is supported in the tubular part of the rocking member by means of ball bearings 23 and 24. The shaft 22 has a splined end 25 which is slidably arranged within a splined sleeve 26. This sleeve meshes with a second splined end 27 of a shaft 28 which is supported by ball bearings 29 and 30 and forms one unitary part with a bevel gear 31.

Figure 2:
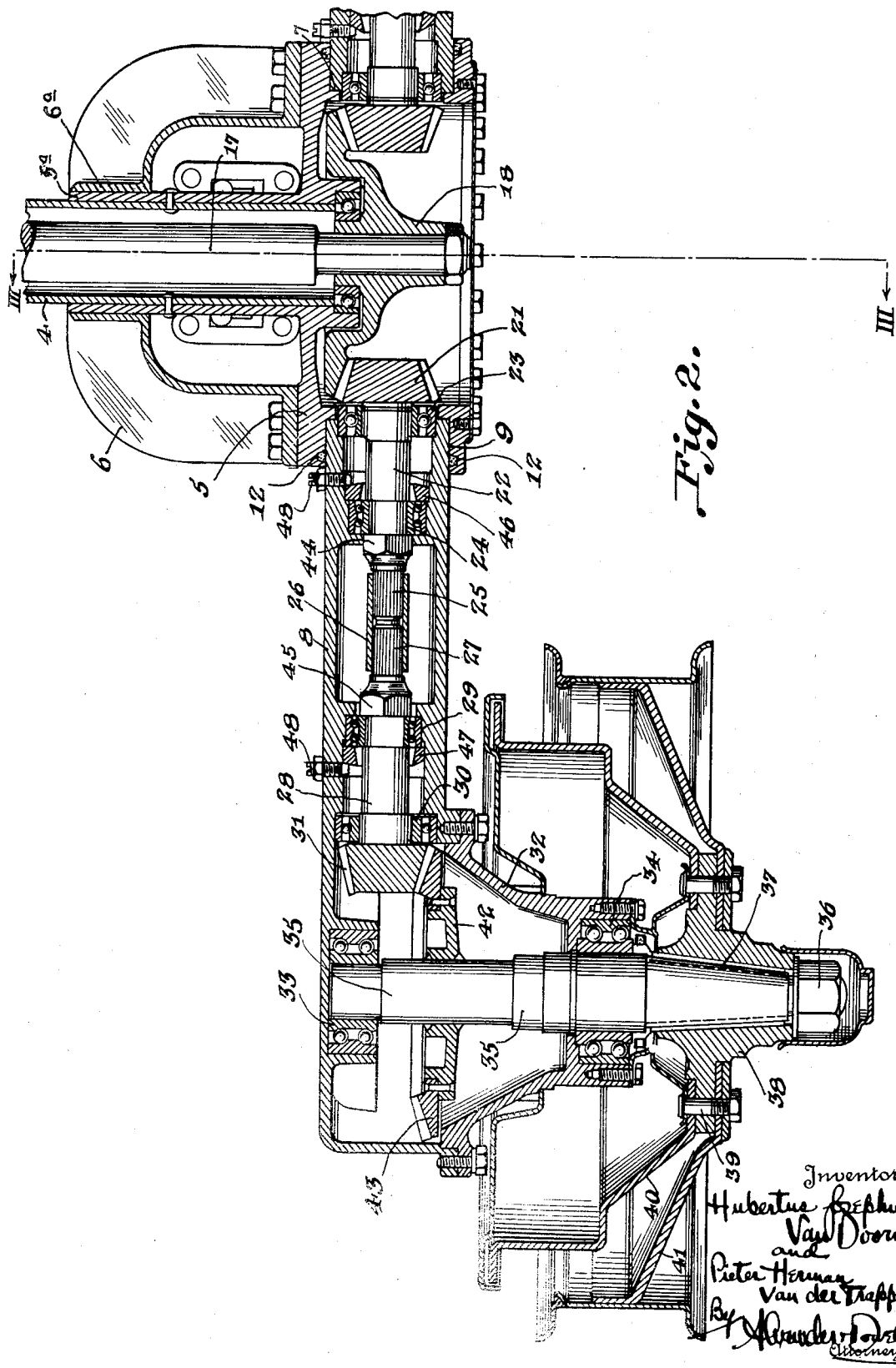
Fig. 2 is a horizontal section taken on the line II—II in Fig. 1.

Each of the ends of the rocking member 8 is closed at the side by a cover 32. The rocking member 8 and the cover 32 contain ball bearings 33 and 34 which rotatably support the wheel shaft 35. The portion of this shaft extending beyond the cover 32 carries a hub 38 fixed thereon by means of a nut 36 and a key 37, a brake drum 40 being fixed by means of bolts 39. These bolts serve at the same time for securing a wheel 41 which in Figures 2 and 3 is shown without a tire, while in Fig. 1 the hub, the brake drum and the wheel are not shown in order to show the parts lying therebehind.

A hub 42 is welded upon the wheel shaft 35 and a bevel gear 43 is riveted to this hub. The bevel gear 43 meshes with the above-mentioned bevel pinion 31, so that the wheel shaft 35 is driven by the rear axle shaft 17 through the bevel gears 18 and 21, the shaft 22, the sleeve 26, the shaft 28 and the bevel gears 31 and 43. In order to obtain a silent drive the bevel gears are preferably made as helical gears.

Any play which might occur in the drive may be removed in the following way: The inner rings of the ball bearings 24 and 29 are secured to the shafts 22 and 28 respectively by nuts 44 and 45. The outer rings of these ball bearings are in contact with rings 46 and 47 which are kept in their places by screws 48 extending through the rocking member and being locked by lock nuts. The inner end of these screws is bevelled so that turning the screws inwardly will result in a displacement of the rings 46 and 47.

The cylindrical portion 7 of the carrier 5 is provided with openings 49 which allow displacement of the ball bearings 23 when the rocking member is swivelling. It is necessary to limit the rocking movement of this member in such a way that there is no danger that the ball bearings 23 would touch the edges of the opening 49.

The gear ratio may be such that after removing the rear wheels of the motor vehicle and securing the rear axle support according to the invention, the road wheels are driven with a greater reduction than the reduction of the normal wheel drive. Consequently the motor vehicle being made adapted for use on rough ground, will not develop such a speed as on the road but develops a greater pulling force. It is also possible to drive the wheels at the normal speed but to use a reduction gear arranged within the rocking member when ground conditions make this necessary or desirable.

Since the wheels are rotating always in the same plane it is possible to lay an endless band around the wheels of each rocking member so that the vehicle is still better adapted to move on trackless ground. Further it is possible to arrange a guiding roller for the endless band in front of the foremost wheel and secured to an extension piece of the rocking member. This roller has a smaller diameter than the road wheels and is arranged at such a height that the front portion of the endless band is inclined so that the vehicle is prevented from digging itself into soft ground.

According to our invention each wheel shaft may be prolonged and may carry road wheels arranged at both sides of the rocking member so that each rocking member is supported by four wheels and no torsional load is exerted when the vehicle is running on a flat surface. Further each pair of wheels, arranged at both sides of the rocking member are adapted to swivel around an axis which is perpendicular to the rocking axis of the rocking member. It is evident that also on uneven ground no torsional load is exerted on the rocking member.

The device according to our invention with a carrier 5 being secured to the rear axle housing a portion 7 of the carrier projecting beyond the axle housing and serving as a bearing for the rocking member, has the advantage that in cross direction the bearing is as near as possible to the point of support on the ground. Consequently the torsional load on the rocking member is kept as low as possible and the bearing is loaded in the most favorable way. The great advantage of the support according to our invention is this that the device may be secured in a very simple way to the rear axle housing of an existing vehicle.

We do not limit our invention to the embodiments shown in the drawings for obviously same may be modified within the scope of the claims; also the carrier and other elements of the device may be made in separate parts where desired.

We claim:

1. Means for transforming a motor vehicle having a conventional axle housing and having a driven wheeled axle journaled therein into a motor tractor having a plurality of driven road wheels at each side of the vehicle, comprising preformed carrier means having a portion adapted to be fixedly secured to the ends of the axle housing when the axle wheels are removed; said carrier means having bearing surfaces coaxial with said housing; reinforcing means connecting said portion and surfaces; rocking members journaled on the bearing surfaces; road wheels carried by the respective rocking members adjacent their ends; driving members adapted to be mounted on the ends of the axle; and means for driving the road wheels from the driving members.

2. In transforming means as set forth in claim 1, said portion of the carrier means comprising a bushing member snugly receiving the end portions of the axle housing, and said bearing surfaces being provided with thrust surfaces; and said rocking members having cooperating bearing and thrust portions whereby the rocking members may swivel on the carrier members but are prevented from axial movement thereon.

3. In transforming means as set forth in claim 1, said portion of the carrier means comprising a bushing member snugly receiving the end portions of the axle housing and said bearing surfaces being provided with thrust surfaces, and said rocking members each comprising abutting sections having complementary bearing and thrust surfaces in their abutting ends adapted to embrace those of the bushing members; and means for securing the sections together.

4. In transforming means as set forth in claim 1, gears adapted to be mounted on the ends of the axle; gears journaled in the rocking members for driving the road wheels; and propeller shafts journaled in the rocking members carrying pinions meshing with the said gears.

5. In transforming means as set forth in claim 1, gears adapted to be mounted on the ends of the axle; gears journaled in the rocking members for driving the road wheels; propeller shafts journaled in the rocking members carrying pinions meshing with the said gears; and means for compensating for wear of the meshing gears and pinions.

H. J. v. DOORNE.
P. H. v. D. TRAPPEN.